United States Patent
Charash

(10) Patent No.: US 7,844,217 B2
(45) Date of Patent: Nov. 30, 2010

(54) POINT-TO-MULTIPOINT COMMUNICATION TERMINAL HAVING A SINGLE RF CHAIN

(75) Inventor: Dan Charash, Haifa (IL)

(73) Assignee: Provigent Ltd., Herzliya (IL)

( * ) Notice: Subject to any disclaimer, the term of this patent is extended or adjusted under 35 U.S.C. 154(b) by 630 days.

(21) Appl. No.: 11/906,483

(22) Filed: Oct. 1, 2007

(65) Prior Publication Data

US 2009/0088103 A1 Apr. 2, 2009

(51) Int. Cl.
*H04B 3/36* (2006.01)
*H04B 7/14* (2006.01)

(52) U.S. Cl. ............... 455/7; 455/562.1; 455/67.11; 455/561; 455/13.1; 370/334; 370/279; 370/315

(58) Field of Classification Search ........... 455/562.1, 455/450, 67.11, 422.1, 446, 561, 456.5, 524, 455/7, 13.1, 23, 575.7, 272, 132, 101, 447, 455/63.1, 279, 553.1, 443, 103; 370/344, 370/442, 334, 345, 236, 329, 279, 315, 321, 370/337, 347, 319

See application file for complete search history.

(56) References Cited

U.S. PATENT DOCUMENTS

| 4,856,027 | A | 8/1989 | Nakamura et al. |
| 6,005,884 | A | 12/1999 | Cook et al. |
| 6,006,069 | A | 12/1999 | Langston |
| 6,016,313 | A | 1/2000 | Foster et al. |
| 6,388,997 | B1 | 5/2002 | Scott |
| 6,600,776 | B1 | 7/2003 | Alamouti et al. |
| 6,744,808 | B1 | 6/2004 | Walley et al. |
| 6,859,655 | B2 * | 2/2005 | Struhsaker ............ 455/450 |
| 6,965,633 | B2 | 11/2005 | Sun et al. |
| 7,277,679 | B1 | 10/2007 | Barratt et al. |
| 7,336,626 | B1 | 2/2008 | Barratt et al. |
| 2002/0126748 | A1 | 9/2002 | Rafie et al. |
| 2003/0162568 | A1 * | 8/2003 | Schreiner et al. ............ 455/562 |

(Continued)

FOREIGN PATENT DOCUMENTS

GB 2412541 9/2005

(Continued)

OTHER PUBLICATIONS

U.S. Appl. No. 11/492,371 Official Action dated Jan. 2, 2009.

(Continued)

*Primary Examiner*—Sujatha Sharma
(74) *Attorney, Agent, or Firm*—D. Kligler I,P. Service Ltd

(57) ABSTRACT

A communication terminal includes first and second antennas for respectively communicating with first and second remote terminals and a single up-converter that is arranged to up-convert an input signal to produce an RF transmit signal. The communication terminal further includes a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals.

17 Claims, 3 Drawing Sheets

U.S. PATENT DOCUMENTS

| | | | |
|---|---|---|---|
| 2004/0014447 A1 | 1/2004 | Hepler et al. | |
| 2004/0071165 A1 | 4/2004 | Redfern et al. | |
| 2004/0102219 A1 | 5/2004 | Bunton et al. | |
| 2004/0136317 A1 | 7/2004 | Mohan | |
| 2004/0141469 A1 | 7/2004 | Jung et al. | |
| 2005/0008065 A1* | 1/2005 | Schilling | 375/148 |
| 2005/0174954 A1 | 8/2005 | Kim et al. | |
| 2005/0245298 A1* | 11/2005 | Mori | 455/575.7 |
| 2006/0052066 A1* | 3/2006 | Cleveland et al. | 455/101 |
| 2006/0067426 A1 | 3/2006 | Maltsev et al. | |
| 2007/0111678 A1* | 5/2007 | Viswanath et al. | 455/101 |
| 2007/0280116 A1* | 12/2007 | Wang et al. | 370/236 |
| 2008/0019336 A1 | 1/2008 | Charash | |
| 2008/0170533 A1 | 7/2008 | Cyzs et al. | |
| 2008/0212526 A1* | 9/2008 | Oyman | 370/329 |

FOREIGN PATENT DOCUMENTS

| | | |
|---|---|---|
| WO | WO 02/58270 | 1/2002 |
| WO | WO 03/071723 | 8/2003 |
| WO | 03090011 A2 | 10/2003 |
| WO | WO 2004/056013 | 7/2004 |

OTHER PUBLICATIONS

U.S. Appl. No. 11/492,371 Official Action dated Jun. 6, 2009.
U.S. Appl. No. 11/492,371 Advisory Action dated Jul. 17, 2009.
Ericsson AB, "Capacity without ties; Mini-Link microwave transmission solution", EN/LZT 712 0117 R2, Molndal, Sweden, 2005.
Hitachi Kokusai Electric Inc., "25GHz bank high-speed radio repeater "SINELINK 25g" commercialization", Feb. 15, 2005.
International Application PCT/IL2008/001271 Search Report dated Feb. 12, 2009.
www.ericsson.com/products/hp/mini_link_pa.shtml.
www.h-kokusai.com/products/wireless/broadband/sinelink25g.html.
Karam & Sari, "Analysis of predistortion, equalization, and ISI cancellation techniques in digital radio systems with nonlinear transmit amplifiers", IEEE Transactions on communications (37:12) Dec. 1989, pp. 1245-1253.
Karam & Sari, "A data predistortion technique with memory for QAM radio systems", IEEE transactions on communications (39:2), Feb. 2001, pp. 336-344.
Gansman, et al., "Optimum and suboptimum frame synchronization for pilot-symbol-assisted modulation", IEEE transactions on communications (45:10), Oct. 1997, pp. 1327-1337.
"Microwave transmission in mobile networks", Ericsson Review, No. 3, 2002, pp. 124-131.
Worthen & Stark, "Unified design of iterative receivers using factor graphs", IEEE transactions on information theory, (47:2), Feb. 2001, pp. 843-849.
Richardson & Urbanke, "An introduction to the analysis of iterative coding systems", Proceedings of the 1999 Institute for Mathematics and its Applications (IMA), Summer program: Codes, Systems and Graphical Models, Minneapolis, Minnesota, Aug. 2-6, 1999.
David Trinkowon, "PHY Nomenclature", Jan. 21, 2001.
Jeff Orr, "802.16 and 802.11: the right technology in the right place", Jul. 11, 2003.
Raj Jain, Wireless metropolitan area networks \9WMANs), Washington University in St. Louis, 2006.
Evolutive™ WiMAX Series, Jan. 2006.
"IEEE 802.16 and WiMAX—a Status Review", Presented to ISAAC on Oct. 18, 2005.
Position paper, by Proxim Wireless Corporation, 2006.
Intel Technology Journal, vol. 8, Issue 3, Publishe Aug. 20, 2004.

* cited by examiner

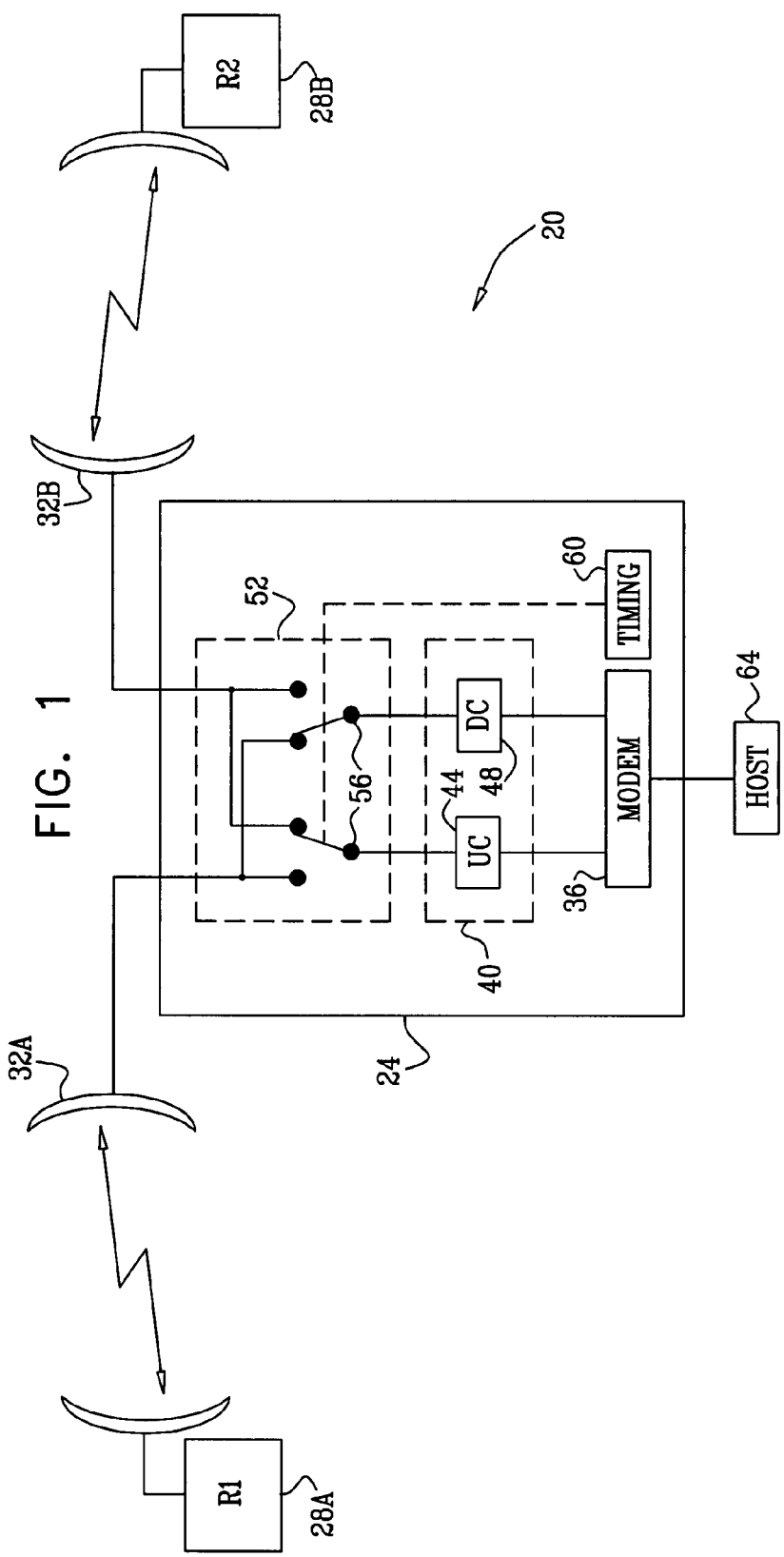

POINT-TO-MULTIPOINT COMMUNICATION TERMINAL HAVING A SINGLE RF CHAIN

FIELD OF THE INVENTION

The present invention relates generally to communication systems, and particularly to wireless point-to-multipoint communication terminals.

BACKGROUND OF THE INVENTION

Microwave communication links are sometimes deployed in point-to-multipoint configurations, in which a point-to-multipoint communication terminal communicates with two or more remote terminals. For example, Bolle and Nascimbene describe several point-to-point and point-to-multipoint configurations of microwave links in "Microwave Transmission in Mobile Networks," Ericsson Review, No. 3, 2002, pages 124-131, which is incorporated herein by reference. As another example, U.S. Pat. No. 6,006,069 describes a point-to-multipoint system provided by a nodal transmitter located in a node with a plurality of nodal antennas radiating different polarization signals about the node. The system includes subscriber stations with directional antennas adapted to receive signals radiated from the nodal transmitter.

Communication with more than one remote terminal is also performed by other types of communication terminals, such as repeaters. For example, U.S. Patent Application Publication 2006/0052066, whose disclosure is incorporated herein by reference, describes a repeater for re-transmitting an incoming RF signal. The repeater includes a first antenna array for receiving the incoming RF signal, a second antenna array for transmitting an outgoing RF signal, and a transceiver for down-converting the incoming RF signal to a down-converted signal, processing the down-converted signal, and up-converting the processed signal to produce the outgoing RF signal. The first antenna array is cross-polarized with respect to the second antenna array.

SUMMARY OF THE INVENTION

Embodiments of the present invention provide a communication terminal, including:

first and second antennas, for respectively communicating with first and second remote terminals;

a single up-converter, which is arranged to up-convert an input signal to produce an RF transmit signal; and a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals.

In some embodiments, the terminal includes a single down-converter, which is arranged to down-convert an RF receive signal received via the first and second antennas to produce an output signal, and the switching circuit is arranged to couple the single down-converter to one of the first and second antennas during the first time intervals, and to the other of the first and second antennas during the second time intervals. In an embodiment, the one of the first and second antennas includes the first antenna. In another embodiment, the one of the first and second antennas includes the second antenna.

In a disclosed embodiment, the terminal includes a modem, which is arranged to demodulate the output signal so as to extract inbound data that is transmitted to the terminal from the first and second remote terminals, and to modulate outbound data to be transmitted to the first and second remote terminals to produce the input signal. The modem may be arranged to use the extracted inbound data as the outbound data, so as to serve as a repeater between the first and second remote terminals. In another embodiment, the modem is arranged to accept the outbound data from a host, and to output the inbound data to the host. In yet another embodiment, the modem includes first and second modem units, which are respectively arranged to demodulate first and second parts of the output signal so as to extract first and second parts of the inbound data that are transmitted from the first and second remote terminals, and to modulate first and second parts of the outbound data to be respectively transmitted to the first and second remote terminals.

In still another embodiment, the first and second antennas are mechanically separate from one another and physically point toward the respective first and second remote terminals.

There is additionally provided, in accordance with an embodiment of the present invention, a method for communication, including:

producing an input signal for communicating with first and second remote terminals via respective first and second antennas;

up-converting the input signal using a single up-converter to produce a Radio Frequency (RF) transmit signal;

coupling the single up-converter to the first antenna in order to transmit the RF transmit signal to the first remote terminal during first time intervals; and coupling the single up-converter to the second antenna in order to transmit the RF transmit signal to the second remote terminal during second time intervals, which do not overlap the first time intervals.

There is additionally provided, in accordance with an embodiment of the present invention, a communication system, including:

first and second remote terminals; and a point-to-multipoint communication terminal, including:

first and second antennas, for respectively communicating with the first and second remote terminals;

a single up-converter, which is arranged to up-convert an input signal to produce an RF transmit signal; and a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals.

The present invention will be more fully understood from the following detailed description of the embodiments thereof, taken together with the drawings in which:

BRIEF DESCRIPTION OF THE DRAWINGS

FIG. 1 is a block diagram that schematically illustrates a point-to-multipoint communication system, in accordance with an embodiment of the present invention;

FIG. 2 is a diagram showing a time-division protocol used in the system of FIG. 1, in accordance with an embodiment of the present invention;

DETAILED DESCRIPTION OF EMBODIMENTS

Overview

Figure 3:
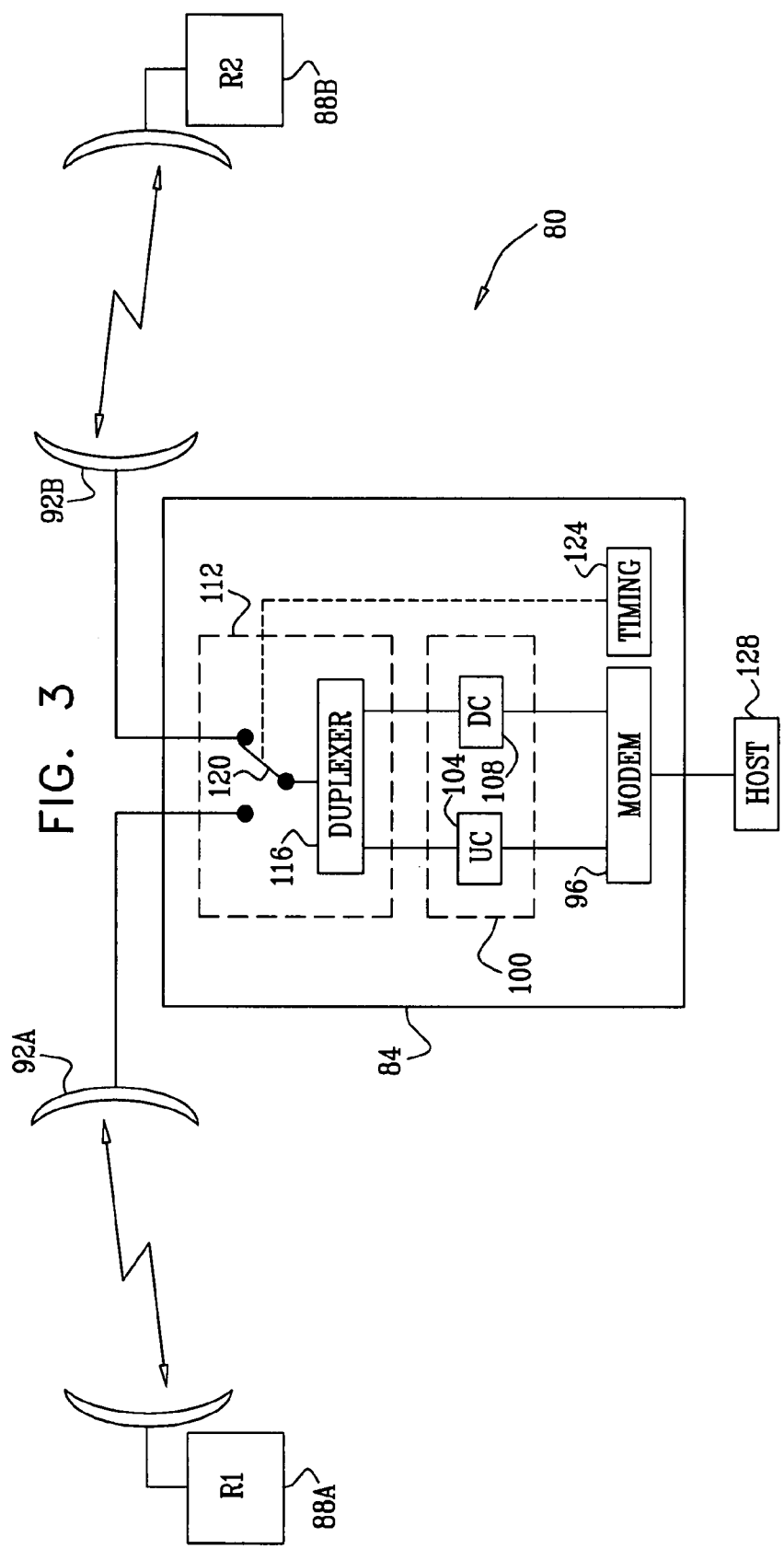
FIG. 3 is a block diagram that schematically illustrates another point-to-multipoint communication system, in accordance with an alternative embodiment of the present invention.

Embodiments of the present invention provide point-to-multipoint communication terminals, which communicate with multiple remote terminals via respective different antennas while using only a single duplex Radio Frequency (RF) chain. The single RF chain comprises a single up-converter and a single down-converter. Such communication terminals can be used in various applications, e.g., as repeaters, hubs or other point-to-multipoint nodes.

The point-to-multipoint communication terminals described herein transmit RF signals to the remote terminals in an alternating time-division protocol, so as to transmit only to a single remote terminal, via the respective antenna, at any given time. The point-to-multipoint communication terminal comprises a switching circuit, which connects the single RF chain to the antennas. The switching circuit switches the output of the up-converter and the input of the down-converter to the appropriate antennas, as defined by the time-division protocol.

In some embodiments, the point-to-multipoint communication terminal transmits signals to a certain remote terminal while receiving signals from another. Transmission and reception may be performed on the same frequency or on different frequencies. In alternative embodiments, the point-to-multipoint terminal simultaneously receives RF signals from the same remote terminal to which it transmits. The point-to-multipoint terminal typically comprises a single modem, which alternately processes the signals associated with the different remote terminals.

Some known point-to-multipoint systems communicate via multiple antennas, such that the transmission to and from the remote terminals overlap in space and/or in time. Unlike such known systems, the methods and systems described herein use multiple antennas and a single RF chain, such that transmissions do not overlap in time or space.

The point-to-multipoint communication terminals described herein enable a cost-efficiency trade-off that is different from point-to-multipoint terminals that use multiple RF chains. On one hand, the data throughput exchanged with each remote terminal is reduced, because each remote terminal communicates with the point-to-point terminal during only part of the time. On the other hand, since the point-to-multipoint terminals described herein use only a single up-converter and a single down-converter, their cost, complexity and power consumption are often considerably lower than terminals that use multiple RF chains.

System Description

FIG. 1 is a block diagram that schematically illustrates a point-to-multipoint communication system 20, in accordance with an embodiment of the present invention. System 20 comprises a point-to-multipoint communication terminal 24, which communicates with two remote terminals 28A (denoted R1) and 28B (denoted R2) via respective antennas 32A and 32B. Although FIG. 1 shows a configuration of two remote terminals, in alternative embodiments terminal 24 may communicate with any number of remote terminals.

Antennas 32A and 32B typically comprise antennas that are physically separate from one another and are mechanically pointed toward their respective remote terminals. System 20 may operate at any suitable frequency band, such as using microwave or millimeter-wave frequencies.

Terminal 24 comprises a modem 36, which accepts data for transmission to remote terminals 28A and 28B, and outputs data received from the remote terminals. Modem 36 typically carries out functions such as modulation and demodulation, error correction encoding and decoding, gain control, equalization, synchronization and carrier recovery, as are known in the art. In some embodiments, the functions of modem 36 may be split among two or more modems or modem units. For example, terminal 24 may comprise a separate modem for communicating with each of the remote terminals.

Terminal 24 comprises a single Radio Frequency (RF) chain 40, which comprises a single up-converter 44 and a single down-converter 48. A switching circuit 52, in the present example comprising two RF switches 56, connects the output of up-converter 44 and the input of down-converter 48 to antennas 32A and 32B. The operation of switching circuit 52 is explained in greater detail further below.

Data for transmission to the remote terminals is processed by modem 36, which produces modulated digital samples. The samples are converted to a low-frequency analog signal by a Digital to Analog Converter (DAC), not shown in the figure. The low-frequency signal may comprise a baseband or Intermediate Frequency (IF) signal. The low-frequency analog signal is up-converted by up-converter 44 to a suitable radio frequency. The up-converter typically filters and amplifies the signal, to produce a high power RF signal.

The RF signal produced by up-converter 44 is fed via switching circuit 52 to one of antennas 32A and 32B. Thus, according to the state of switches 56, the RF signal can be transmitted either to remote terminal 28A or to remote terminal 28B.

RF signals received by antennas 32A and 32B are provided to switching circuit 52. The switching circuit connects one of the antennas to the input of down-converter 48 at any given time. Thus, the state of switches 56 selects whether the down-converter will process the RF signal received from remote terminal 28A or 28B.

Down-converter 48 down-converts the output of the selected antenna, and typically performs functions such as filtering, amplification and sometimes gain control. The down-converter produces a low-frequency signal that is digitized by an Analog to Digital Converter (ADC), not shown in the figure. The digitized signal is processed by modem 36, which extracts and outputs the data transmitted by the remote terminals.

A timing unit 60 controls switches 56 of circuit 52, so as to alternate between the antennas. An exemplary time-division switching protocol that can be used by terminal 24 is described in FIG. 2 below. A host 64 provides the data for transmission to the remote terminals and accepts the data received from the remote terminals.

FIG. 2 is a diagram showing a time-division protocol that can be used in system 20 of FIG. 1 above, in accordance with an embodiment of the present invention. In the present example, terminal 24 transmits to one remote terminal and receives from another remote terminal simultaneously. Timing unit 60 of point-to-multipoint terminal 24 controls switching circuit 52 in accordance with a time-division protocol, which comprises time intervals 70. As can be seen in the figure, both transmission and reception of terminal 24 alternate between remote terminals 28A and 28B from one time interval 70 to the next. In each interval, terminal 24 transmits to one of the remote terminals and receives from the other.

In other words, in a certain time interval, unit 60 controls switches 52 to connect antenna 32A to up-converter 44 and antenna 32B to down-converter 48. As a result, terminal 24 transmits to remote terminal 28A (R1) and receives from remote terminal 28B (R2) simultaneously. In the following time interval, unit 60 controls switches 52 to connect antenna 32B to up-converter 44 and antenna 32A to down-converter 48. In this interval, terminal 24 transmits to remote terminal 28B (R2) and receives from remote terminal 28a (R1). Transmission and reception may be performed on the same frequency or on different frequencies.

The exemplary protocol of FIG. 2 can be generalized to any number of remote terminals. For example, when terminal 24 communicates with three remote terminals denoted R1, R2 and R3, the protocol may comprise three types of time intervals used in alternation. In the first interval type, terminal 24 transmits to remote terminal R2 and receives from R1, in the second interval type terminal 24 transmits to R3 and receives from R2, and in the third interval type terminal 24 transmits to R1 and receives from R3. Alternatively, any other suitable time-division protocol, in which terminal 24 simultaneously transmits to one remote terminal and receives from another, can be used.

FIG. 3 is a block diagram that schematically illustrates a point-to-multipoint communication system 80, in accordance with an alternative embodiment of the present invention. System 80 comprises a point-to-multipoint communication terminal 84, which communicates with remote terminals 88A (denoted R1) and 88B (denoted R2) via respective antennas 92A and 92B. Unlike the configuration of FIGS. 1 and 2 above, in the present example terminal 84 transmits to and receives from the same remote terminal at any given time. An exemplary time-division protocol that can be used by terminal 84 is shown in FIG. 4 below.

Point-to-multipoint terminal 84 comprises a modem 96 and a single RF chain 100 comprising a single up-converter 104 and a single down-converter 108. Terminal 84 comprises a switching circuit 112, in the present example comprising a duplexer 116 and an RF switch 120. Transmission and reception is performed on different frequencies, and duplexer 116 prevents the transmitted signals from interfering with reception. As noted above, the functions of modem 96 may be split among two or more modems, e.g., a separate modem for communicating with each remote terminal.

A timing unit 124 controls switch 120 in accordance with the time-division protocol used. At any given time, both the up-converter output and the down-converter input can be connected to either antenna 92A or 92B. Thus, terminal 84 transmits to and receives from one of the remote terminals in alternation, as defined by the protocol. A host 128 provides the data for transmission to the remote terminals and accepts the data received from the remote terminals.

Figure 4:
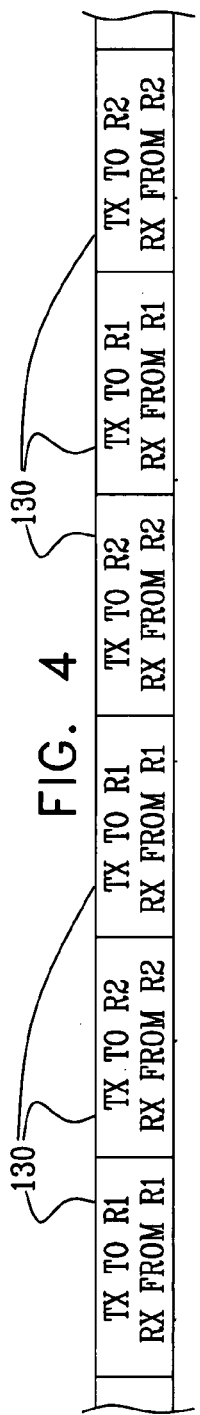
FIG. 4 is a diagram showing a time-division protocol used in the system of FIG. 3, in accordance with an embodiment of the present invention.

FIG. 4 is a diagram showing a time-division protocol used in system 80 of FIG. 3 above, in accordance with an embodiment of the present invention. In the present example, point-to-multipoint terminal 84 transmits to and receives from the same remote terminal at any given time. Timing unit 124 of terminal 84 controls switching circuit 112 in accordance with a time-division protocol, which comprises time intervals 130. Transmission and reception of terminal 84 alternate between remote terminals 88A (R1) and 88B (R2) from one time interval to the next.

In other words, in a certain time interval, unit 124 controls switch 120 to connect the up-converter and the down-converter (via the duplexer) to antenna 92A. As a result, terminal 84 transmits to and receives from remote terminal 88A (R1). In the following time interval, unit 124 controls switch 120 to connect the up-converter and down-converter to antenna 92B. As a result, terminal 84 transmits to and receives from remote terminal 88B (R2) The protocol of FIG. 4 can be generalized to the case of N remote terminals, so that terminal 84 alternates between N different types of time intervals. In each interval type, terminal 84 carries out bidirectional communication with a different remote terminal.

In the protocols of FIGS. 2 and 4 above, as well as in any generalization thereof to a larger number of remote terminals, the sizes of the time intervals may be set to any desired values. Different types of time intervals may have different sizes. Additionally or alternatively, the sizes of some or all types of time intervals may vary over time. The remote terminals are assumed to support and to be synchronized with the time-division protocol of the point-to-multipoint terminal.

In some embodiments, the point-to-point terminal (e.g., terminal 24 in FIG. 1 above or terminal 84 of FIG. 3 above) is installed in a single mechanical enclosure, which may be installed either in proximity to or distant from the antennas. Alternatively, the functions of the terminal may be split between an Indoor Unit (IDU) and an Outdoor Unit (ODU), which is installed near the antennas.

Exemplary Applications

Figure 5:
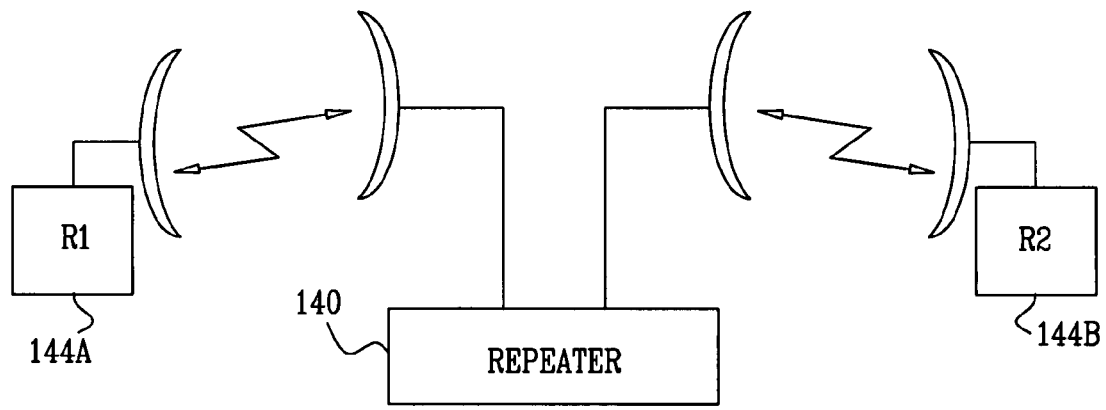
FIG. 5 is a block diagram that schematically illustrates a point-to-multipoint communication system having a repeater configuration, in accordance with an embodiment of the present invention.
Figure 6:
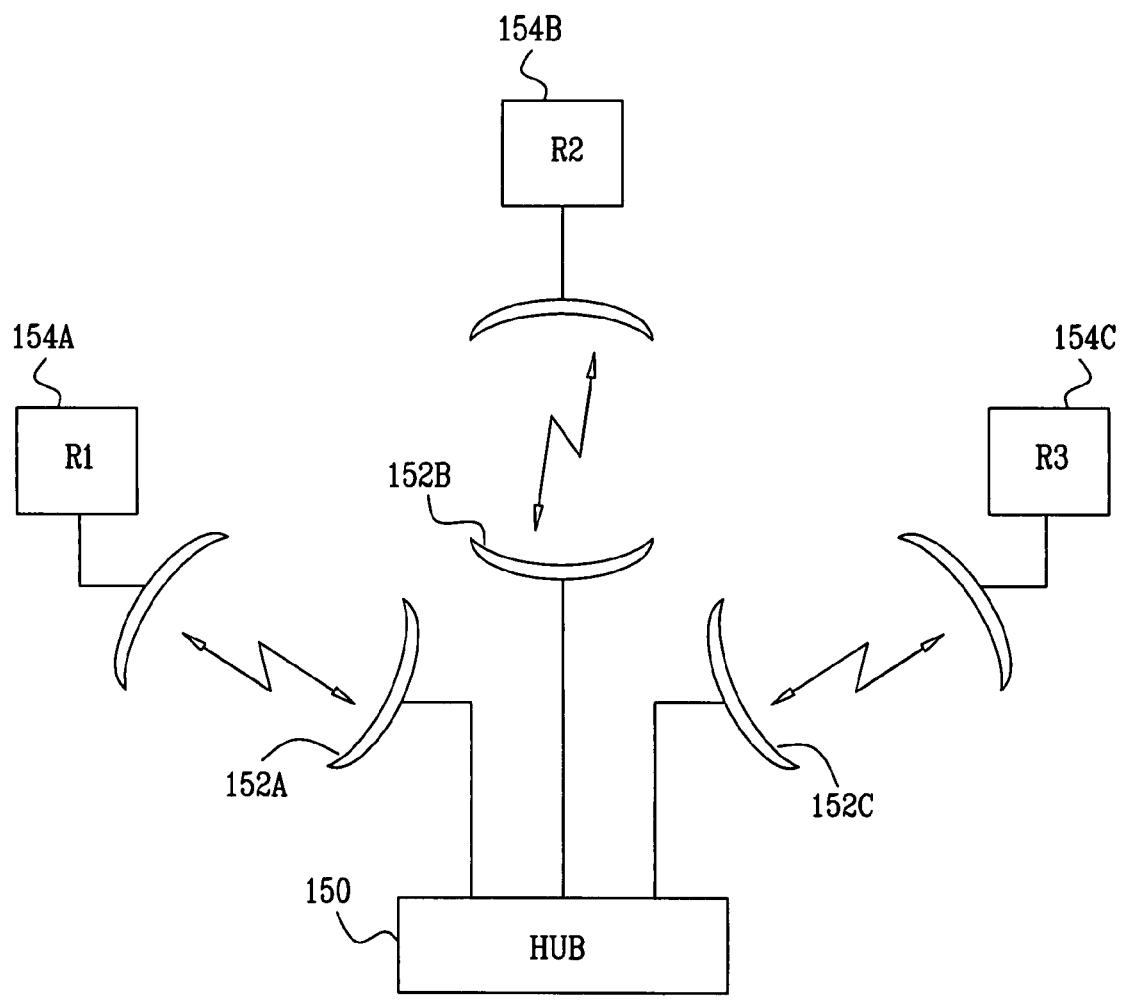
FIG. 6 is a block diagram that schematically illustrates a point-to-multipoint communication system having a star configuration, in accordance with another embodiment of the present invention.

The point-to-multipoint terminals described herein can be used in various applications and network configurations. FIGS. 5 and 6 below demonstrate two exemplary applications, namely a repeater and a hub in a star configuration. Alternatively, the point-to-multipoint terminals described herein can be used in any other suitable application or system configuration.

FIG. 5 is a block diagram that schematically illustrates a communication system having a repeater configuration, in accordance with an embodiment of the present invention. In the configuration of FIG. 5, a point-to-multipoint terminal 140, which has a single RF chain and operates in accordance with the principles described herein, functions as a bidirectional repeater between remote terminals 144A and 144B. The RF signal transmitted from one of the remote terminals is received, down-converted and processed by the modem in terminal 140. The data extracted from the received signal is fed back to the modem, modulated, up-converted and a corresponding RF signal is transmitted toward the other remote terminal.

FIG. 6 is a block diagram that schematically illustrates a point-to-multipoint communication system having a star configuration, in accordance with another embodiment of the present invention. In this configuration, a point-to-multipoint terminal 150, which has a single RF chain and operates in accordance with the principles described herein, functions as a hub of the star configuration. Terminal 150 comprises three antennas 152A . . . 152C for respectively communicating with three remote terminals 154A . . . 154C. Terminal 150 can facilitate communication among the remote terminals, as well as exchange data between the remote terminals and a host or other network or system.

Although the embodiments described herein mainly address wireless point-to-multipoint terminals having a single RF chain, the principles of the present invention can also be used for additional applications, such as various wireline RF communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication terminal, comprising:
   first and second antennas, for respectively communicating with first and second remote terminals;
   a single up-converter, which is arranged to up-convert an input signal to produce an RF transmit signal;
   a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals;
   a single down-converter, which is arranged to down-convert an RF receive signal received via the first and second antennas to produce an output signal, and wherein the switching circuit is arranged to couple the single down-converter to one of the first and second antennas during the first time intervals, and to the other of the first and second antennas during the second time intervals; and
   a modem, which is arranged to demodulate the output signal so as to extract inbound data that is transmitted to the terminal from the first and second remote terminals, and to modulate outbound data to be transmitted to the first and second remote terminals to produce the input signal,
   wherein the modem comprises first and second modem units, which are respectively arranged to demodulate first and second parts of the output signal so as to extract first and second parts of the inbound data that are transmitted from the first and second remote terminals, and to modulate first and second parts of the outbound data to be respectively transmitted to the first and second remote terminals.

2. The terminal according to claim 1, wherein the one of the first and second antennas comprises the first antenna.

3. The terminal according to claim 1, wherein the one of the first and second antennas comprises the second antenna.

4. The terminal according to claim 1, wherein the modem is arranged to accept the outbound data from a host, and to output the inbound data to the host.

5. The terminal according to claim 1, wherein the first an second antennas are mechanically separate from one another and physically point toward the respective first and second remote terminals.

6. A communication terminal, comprising:
   first and second antennas, for respectively communicating with first and second remote terminals;
   a single up-converter, which is arranged to up-convert an input signal to produce an RF transmit signal;
   a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals;
   a single down-converter, which is arranged to down-convert an RF receive signal received via the first and second antennas to produce an output signal, and wherein the switching circuit is arranged to couple the single down-converter to one of the first and second antennas during the first time intervals, and to the other of the first and second antennas during the second time intervals; and
   a modem, which is arranged to demodulate the output signal so as to extract inbound data that is transmitted to the terminal from the first and second remote terminals, and to modulate outbound data to be transmitted to the first and second remote terminals to produce the input signal,
   wherein the modem is arranged to use the extracted inbound data as the outbound data, so as to serve as a repeater between the first and second remote terminals.

7. A method for communication, comprising:
   producing an input signal for communicating with first and second remote terminals via respective first and second antennas;
   up-converting the input signal using a single up-converter to produce a Radio Frequency (RF) transmit signal;
   coupling the single up-converter to the first antenna in order to transmit the RF transmit signal to the first remote terminal during first time intervals;
   coupling the single up-converter to the second antenna in order to transmit the RF transmit signal to the second remote terminal during second time intervals, which do not overlap the first time intervals;
   coupling a single down-converter to one of the first and second antennas during the first time intervals and to the other of the first and second antennas during the second time intervals, and down-converting an RF receive signal received via the first and second antennas to produce an output signal; and
   demodulating the output signal so as to extract inbound data that is transmitted to the terminal from the first and second remote terminals, and modulating outbound data to be transmitted to the first and second remote terminals to produce the input signal,
   wherein modulating the outbound data comprises using the extracted inbound data as the outbound data, so as to serve as a repeater between the first and second remote terminals.

8. The method according to claim 7, wherein the one of the first and second antennas comprises the first antenna.

9. The method according to claim 7, wherein the one of the first and second antennas comprises the second antenna.

10. The method according to claim 7, wherein modulating the outbound data comprises accepting the outbound data from a host, and wherein demodulating the output signal comprises outputting the inbound data to the host.

11. The method according to claim 7, wherein the first an second antennas are mechanically separate from one another and physically point toward the respective first and second remote terminals.

12. A communication system, comprising:
   first and second remote terminals; and
   a point-to-multipoint communication terminal, comprising:

first and second antennas, for respectively communicating with the first and second remote terminals;

a single up-converter, which is arranged to up-convert an input signal to produce an RF transmit signal; and a switching circuit, which is arranged to couple the single up-converter to the first antenna in order to transmit the RF transmit signal to the first remote terminal during first time intervals, and to couple the single up-converter to the second antenna in order to transmit the RF transmit signal to the second remote terminal during second time intervals, which do not overlap the first time intervals, wherein the point-to-multipoint communication terminal comprises a modem, which is arranged to demodulate the output signal so as to extract inbound data that is transmitted to the terminal from the first and second remote terminals, and to modulate outbound data to be transmitted to the first and second remote terminals to produce the input signal, and wherein the modem is arranged to use the extracted inbound data as the outbound data, so as to serve as a repeater between the first and second remote terminals.

13. The system according to claim 12, wherein the point-to-multipoint communication terminal comprises a single down-converter, which is arranged to down-convert an RF receive signal received via the first and second antennas to produce an output signal, and wherein the switching circuit is arranged to couple the single down-converter to one of the first and second antennas during the first time intervals, and to the other of the first and second antennas during the second time intervals.

14. The system according to claim 12, wherein the one of the first and second antennas comprises the first antenna.

15. The system according to claim 12, wherein the one of the first and second antennas comprises the second antenna.

16. The system according to claim 12, wherein the modem is arranged to accept the outbound data from a host, and to output the inbound data to the host.

17. The system according to claim 12, wherein the first an second antennas are mechanically separate from one another and physically point toward the respective first and second remote terminals.

* * * * *